455-612 AU 233 EX

FIP8106 XR 4,002,897

(7)

RS

United Sta [redacted]

Kleinman et al.

Y5009R

[11] 4,002,897

[45] Jan. 11, 1977

[54] OPTO-ACOUSTIC TELEPHONE RECEIVER

[75] Inventors: David Allmond Kleinman, Lebanon; Donald Frederick Nelson, Summit, both of N.J.

[73] Assignee: Bell Telephone Laboratories, Incorporated, Murray Hill, N.J.

[22] Filed: Sept. 12, 1975

[21] Appl. No.: 612,761

[52] U.S. Cl. ........................... 250/199; 250/211 R; 350/96 WG; 179/182 R; 181/138; 181/159

[51] Int. Cl.² ........................................ H04B 9/00

[58] Field of Search .......... 250/199, 228, 211, 231; 350/96 WG

[56] References Cited

UNITED STATES PATENTS

| | | | |
|---|---|---|---|
| 235,199 | 12/1880 | Bell | 250/199 |
| 235,496 | 12/1880 | Bell | 250/199 |
| 241,909 | 5/1881 | Bell | 250/199 |
| 3,659,452 | 5/1972 | Atwood | 250/43.5 R |
| 3,700,890 | 10/1972 | Kruezer | 250/43.5 R |

OTHER PUBLICATIONS

"Upon the Production of Sound by Radiant Energy," Phil. Mag., Series 5, vol. 11, pp. 510–528; 1881.

Acoustical Engineering, Olson, D. van Nostrand Co. Inc. Copyright 1957, pp. 100–123.

Journal of Applied Physics, (June 1971), "Ultralow Gas Concentration Infrared Absorption Spectroscopy," pp. 2934–2939.

*Primary Examiner*—Benedict V. Safourek
*Assistant Examiner*—Michael A. Masinick
*Attorney, Agent, or Firm*—David I. Caplan

[57] ABSTRACT

An opto-acoustic telephone receiver, for converting optical signals propagating in an optical fiber waveguide into audible acoustic signals, includes an optical absorption cell having a volume of the order of $10^{-3}$ $cm^3$, acoustically coupled to the narrow end of a tapered acoustic tube whose wide end can be acoustically coupled to a human ear.

13 Claims, 5 Drawing Figures

OPTO-ACOUSTIC TELEPHONE RECEIVER

FIELD OF THE INVENTION

This invention relates to the field of optical communications, and more particularly to telephone receivers for converting optical signals to audible acoustic signals.

BACKGROUND OF THE INVENTION

In a telephone system, the use of optical carrier waves for transmission has an advantage over the use of electrical wires in environments of very high electromagnetic fields. Moreover, optical fibers for transmitting telephone signals are made from relatively plentiful raw materials as compared with the raw materials required for electrical wires (copper, usually). Accordingly, the use of optical fibers for telephone transmission from sender to receiver is an attractive alternative for a telephone communication system. One of the problems associated with such a system is the conversion by a receiver of the incoming optical signal on the fiber into an acoustic signal which is audible by a human ear.

Almost 100 years ago, Alexander Graham Bell invented a completely optical communication system including apparatus which he named "photophone". The system was fairly simple, utilizing a transmitter for converting human voice signal waves into correspondingly power-modulated optical signals. These optical signals were detected by a (remote) receiver for converting the optical signals into audible acoustic signals which were a faithful representation of the original human voice signals. Several of the patents issued on this system include U.S. Pat. No. 235,199, (Dec. 7, 1880) to A. G. Bell; U.S. Pat. No. 235,496 (Dec. 14, 1880) to A. G. Bell and S. Tainter, and U.S. Pat. No. 241,909, (May 24, 1881) to A. G. Bell and S. Tainter. In addition, a paper on this subject was published by A. G. Bell in Philosophical Magazine, Vol. 11 (Series 5), pp. 510–528 (1881), entitled "Upon the Production of Sound by Radiant Energy." Such an optical communication system relied upon a rather intense source of light, which then could be provided only by sunlight, a relatively unreliable source, and upon transmission of the light through the air, a relatively unreliable transmission path. With the advent in recent years of intense optical laser sources and of optical fibers, the possibility of a reliable optical communication system is thus more realistic. Such a system includes at one end a transmitter feeding an optical fiber. The optical fiber would ordinarily bring the optical signal to a repeater which then feeds an amplified optical signal to another optical fiber, ultimately bringing the optical signal to an opto-acoustic receiver. The receiver then converts the optical signal into an audible acoustic signal for delivery to a receiving human ear.

The opto-acoustic receivers proposed in the prior art involved a hollow chamber wich contained an optical absorbing material such as dark-colored cotton-wool or other fibrous materials, spongy metal, or lampblack. The process of absorption of the light signal produced corresponding acoustic waves. At the opposite end of the chamber from which the light entered was attached a hollow cylindrical acoustic wave transmission tube for bringing the acoustic waves to a human ear.

SUMMARY OF THE INVENTION

We have found that the conversion efficiency of power-modulated optical signals to acoustic signals for listening by a human ear is much improved over the prior art by the use of a much smaller optical absorption chamber, specifically of the order of a thousandth of a cubic centimeter in volume, in combination with a tapered acoustic tube whose narrow end is fed acoustic signals from the chamber. Acoustic waves, which are audible by a human ear, thereby emanate from the wide end of the acoustic tube. The volumetric characteristic of the ordinary human ear, of approximately 6 $cm^3$, dictates that for advantageous efficiency the tube be of a length in the range of about 20 to 150 cm, preferably about 85 cm, tapering from a narrow end of inside cross-sectional area of order $10^{-2}$ $cm^2$ to a wide end of inside cross-sectional area of order 1 $cm^2$.

In a specific embodiment of the invention, a hollow (air-filled) acoustic absorption cell, of about $10^{-3}$ $cm^3$ in volume, contains an optically absorbing dark fibrous material. The chamber has a first aperture for the insertion of an optical fiber waveguide, and a second aperture opening into a hollow acoustic equalization (air-filled) column which is terminated by (and thereby acoustically coupled to) a narrow end of a hollow cylindrical tapered acoustic tube, about 85 cm long. The inside radius of this narrow end is about 0.04 cm. The tube broadens out to a wide end termination, of inside radius about 0.9 cm, against which a human ear can be stationed for listening. Alternatively, the wide end can be terminated by an acoustic equalization diaphragm or membrane, for improving both the coupling efficiency and the high frequency response.

BRIEF DESCRIPTION OF THE DRAWINGS

This invention, together with its features, objects, and advantages, may be better understood from the following detailed description when read in conjunction with the drawings in which.

DETAILED DESCRIPTION

Figure 1:
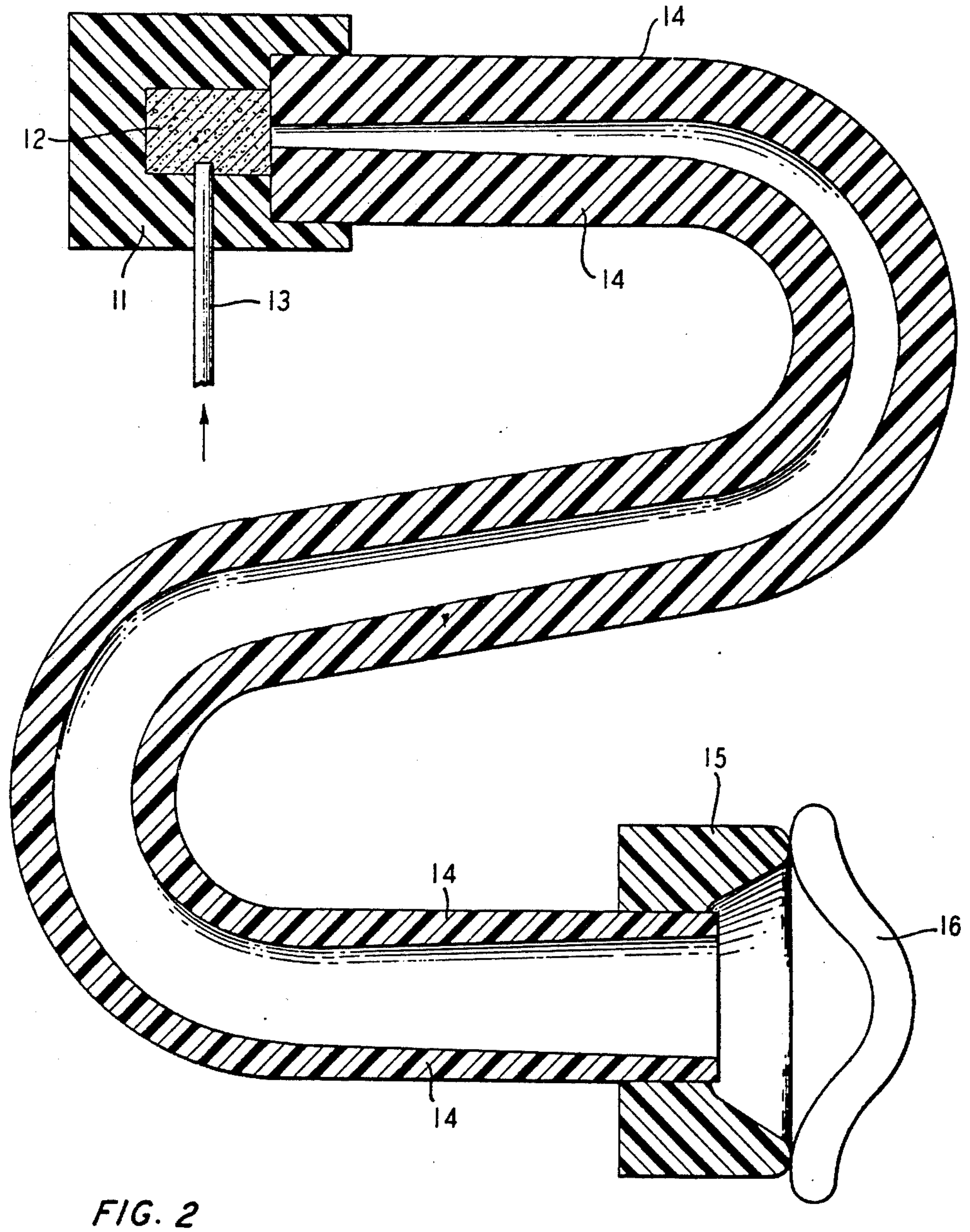
FIG. 1 is a cross-section diagram of an optoacoustic telephone receiver, in accordance with a specific embodiment of the invention.

As shown in FIG. 1, an optical absorption cell 11 includes an air-filled cavity which contains an optical absorbing material 12 such as dark fibrous material, such as charred cotton fibers or other material. Typically about 3 milligram per $cm^3$ of charred cotton fibers is distributed throughout the volume of the cavity, the charred cotton fibers having been produced for example by heating the cotton fibers at a temperature of 500° C for about 1 to 2 minutes in an atmosphere of flowing nitrogen. The cell 11, typically of polyvinyl plastic or aluminum metal, has an aperture for the insertion of an optical fiber 13 which terminates in the cavity of the cell. Thereby, optical radiation propagating in the optical fiber impinges upon the optical absorbing material 12 where the radiation is absorbed.

The cavity containing the absorbing material 12 is typically in the form of a right circular cylinder having a radius of about 0.05 centimeters and an altitide of 0.1 centimeter (about $0.8 \times 10^{-3}$ $cm^3$). A tapered acoustic tube 14, typically of plastic or rubber, whose central cavity is also air-filled, has a narrow apertured end which opens into the cavity containing the optical absorbing material 12. This tube 14 serves to couple the sound energy produced by the interaction of the optical absorbing material 12 with the gas in the cavity to a human ear 16 located at broad end of the tube. The acoustic tapered tube 14 thus broadens in cross section along the direction going away from the absorption cell 11 to an earpiece 15 against which the human ear 16 is gently pressed. The radius of the narrow opening of the tube 14 is typically about 0.04 centimeters, whereas the radius of the opening of the tube 14 at the earpiece end is typically about 0.9 centimeter. The absorption cell 11, the acoustic tube 14 and the earpiece 15 can all be made out of plastic, for example. The distance measured along the tapered tube from its narrow end communicating with the absorption cell 11 at its wide end opening into the volume between the human ear 16 and the earpiece 15 is typically of the order of 100 centimeters, preferably about 85 centimeters. These parameters are calculated to be approximately optimal for the case where the human ear 16 has a cavity volume together with the volume between the ear and the wide end of the tube 14 of about 6 cubic centimeters in toto.

The tapering of the acoustic tube 14 from its narrow end to its wide end advantageously is such that the radius of the tube varies exponentially with distance measured along the tube from the narrow to the wide end along the tube itself. However, a linear or other relationship of radius versus distance along the acoustic tube 14 can be useful.

As indicated in FIG. 1, the tube 14 may be coiled about itself by means of at least two bends and, advantageously for compactness, as many as four such bends or more may be used. In this way, an overall response (sound pressure level) which is flat to within 4 decibels from about 300 to 1500 Hz can be achieved; the response falls by about another 7 decibels from 1500 to 3300 Hz.

A circular cross section for the acoustic tube 14 is preferred because the perimeter-to-area ratio of the cross section, which approximately determines the thermoviscous damping loss in acoustic transmission, is smallest for a circular cross section of such tube.

In order to fabricate the acoustic tube 14, two or more lengthwise plastic pieces of the tube are first molded separately and then sealed together with suitable cement or by thermal bonding. For secure sealing, lengthwise tongues and grooves can be formed along the various edges of the pieces prior to sealing. In addition, the tube can be fabricated in a coiled configuration, located in a hand-holdable telephone receiver.

For some improvement of efficiency, the tube 14 and the cavity of the absorption cell 11 can be filled with xenon gas. Such a gas will provide optimum efficiency by reason of the relatively low viscosity of the gas molecules and the relatively high ratio of specific heats, $C_p/C_v$. In the xenon gas-filled system, the volume of the cavity of the absorption cell is advantageously somewhat smaller, about $6 \times 10^{-4}$ $cm^3$, with narrow tube end radius of about 0.025 cm, wide tube end radius of about 1.3 cm, and tube length of about 55 cm.

Figure 2:
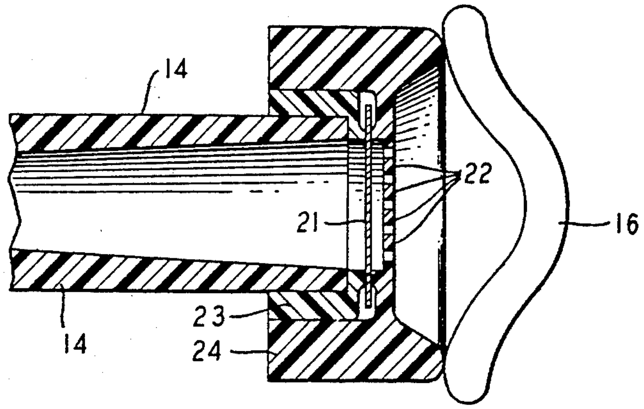
FIG. 2 is a cross-section diagram of an outlet portion of an opto-acoustic telephone receiver, in accordance with an alternative specific embodiment of the invention.

FIG. 2 shows an alternate embodiment of the earpiece portion of the telephone receiver of this invention. The tapered tube 14 (air-filled) terminates at its wide end at an acoustic vibrating diaphragm 21 made of polystyrene, for example, for better acoustic coupling to the ear. A short distance away, an earpiece screen portion 22 of an earpiece 24 is located, in order to protect the diaphragm 21. The diaphragm 21 is held in place by reason of the earpiece 24 held flush against a diaphragm holder 23. The diaphragm holder 23 and the earpiece 24 may both be made out of plastic. The diaphragm holder 23 may be glued or fused to the tapered tube 14, while the earpiece 24 may be screwed (not shown) onto the diaphragm holder 23. Typically, the earpiece screen 22 has a thickness of about 0.1 cm and a porosity ratio of about 0.2 (ratio of open to total area). The diaphragm 21 tends both to improve the average acoustic coupling and to produce a more uniform response across the frequency band (300 Hz to 3300 Hz) by equalizing acoustic impedances of the sound waves on either side thereof.

In the absence of the loaded diaphragm 42 or other acoustic impedance equalization means, then the volume of the conical cavity should be somewhat larger, typically from about $5 \times 10^{-4}$ $cm^3$ to about $10^{-2}$ $cm^3$. In this way, the response at both lower frequency and upper frequency limits of the band (300 to 3300 Hz) is maintained.

Figure 3:
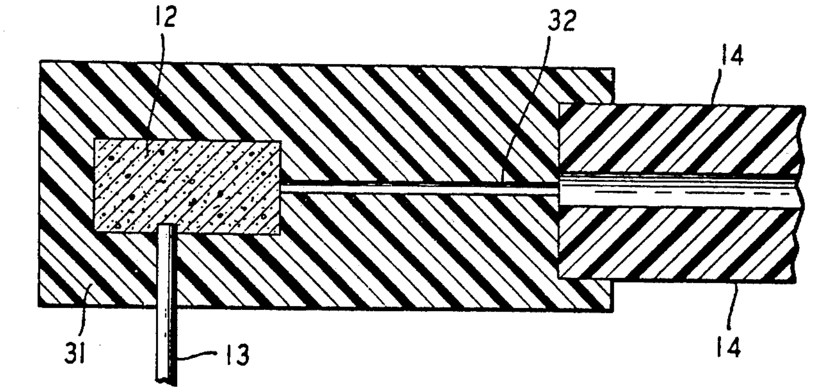
FIG. 3 is a cross-section diagram of an inlet portion of an opto-acoustic telephone receiver, in accordance with another alternate specific embodiment of the invention.

In FIG. 3, between the cavity of an absorption cell 31 and the narrow end of the tapered tube 14 is a hollowed acoustic equalization channel in the form of an air-filled gas column 32 of substantially uniform cross section of the order of $1 \times 10^{-3}$$cm^2$, typically of uniform circular cross section of radius about 0.02 cm. This gas column 32 has a length advantageously of the order of 2 cm, typically about 1.8 cm, running from the cavity of the absorption cell, typically of volume about $8 \times 10^{-4}$ $cm^3$, to the narrow end of the tapered tube 14. In this way the coupling between the optical absorbing cavity and the narrow end of the tapered tube 14 is improved over the corresponding coupling of the cell shown in FIG. 1. Moreover, by means of the air column, an overall response which is flat to within 4 dB can be achieved over the band of about 300 to 3300 Hz.

Figure 4:
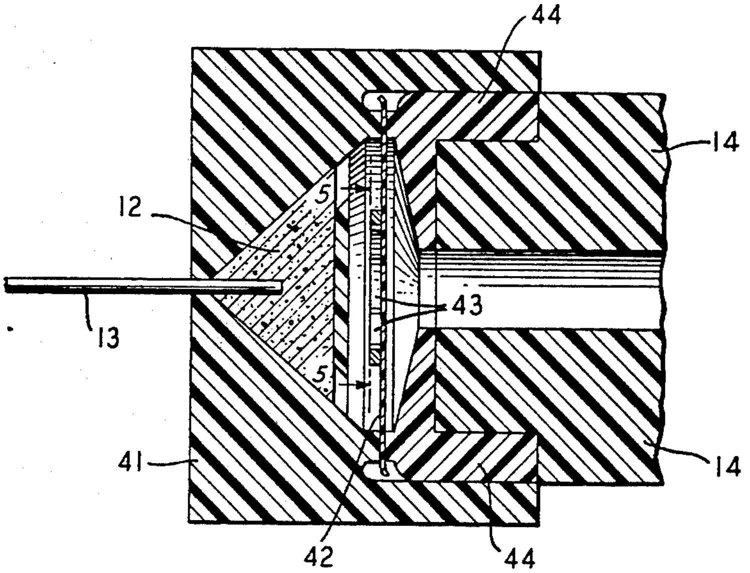
FIG. 4 is a cross-section diagram of an inlet portion of an opto-acoustic telephone receiver, in accordance with still another alternate specific embodiment of the invention.
Figure 5:
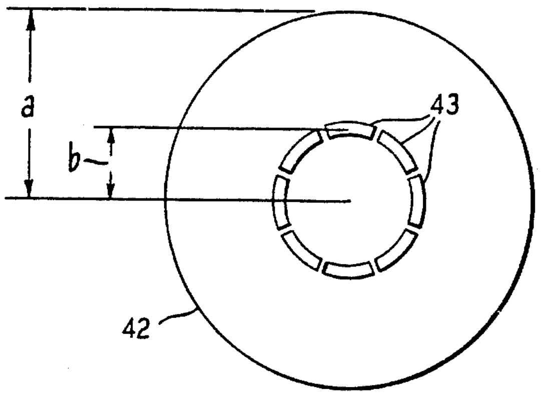
FIG. 5 is a plan view diagram of an acoustic coupling equalization portion of the inlet portion illustrated in FIG. 4.

In FIG. 4, the air-filled cavity of an optical absorption cell 41 is in the form of a pair of right circular cones situated back-to-back. Again, the optical fiber 13 is terminated in the cavity where the optical radiation emerging from the fiber 13 is absorbed. An acoustic vibrating diaphragm 42, typically polystyrene $10^{-3}$ cm thick to which is attached a loading ring 43, enables better coupling of sound waves, produced by the absorption of light coming from the fiber 13, to the narrow end of the tapered tube 14. The loading ring may be conveniently a multiple split ring of gold deposited on a polystyrene diaphragm 42. Typically, the mass of each of the eight gold segments in the ring is about $10^{-3}$ milligrams so that the entire ring has a mass of about $8 \times 10^{-3}$ milligrams. The radius $a$ of the diaphragm 42 is typically about 0.1 cm; the radius $b$ of the gold ring is typically about 0.06 cm; and the thickness of the gold segments in the ring is typically about 0.01 cm. The volume of the conical cavity in the absorption cell 41 is typically about $2.5 \times 10^{-3}$ $cm^3$. The diaphragm 42 is held in place by a diaphragm holder 44. Typically, the diaphragm holder 44 is made of plastic. By means of the loaded diaphragm, an overall response can be achieved which is flat to within 3 dB over the band of 300 to 3300 Hz.

While this invention has been described in detail in terms of a specific embodiment, various modifications can be made without departing from the scope of the invention. For example, while the tapered hollow acoustic tube has been described in terms of a circular cross section, a square or other (tapered) cross-section (monotonically decreasing along the length of the tube) can also be used with a narrow end cross section of the order of 0.01 $cm^2$ and a wide end (adjacent to earpiece) cross section of the order of 1.0 $cm^2$. This acoustic tube can be formed by such techniques as flowing a relatively high melting point heated plastic over a relatively low melting point flexible solid coiled in the form of the desired hollow tapered tube, and then removing (by melting) the solid from the cooled (hardened) plastic.

In certain applications the absorbing material could be a gas or mixture of gases chosen to have a high absorption at the particular wavelength of light being used. Moreover, instead of feeding the acoustic output signal to a human ear, this invention is likewise applicable to the use of an opto-acoustic receiver for feeding the acoustic output to a data processor responsive to acoustic input.

Other optical waveguides, such as a dielectric or a fiber bundle, may be used for introducing the optical radiation into the absorption cell. Instead of the optically absorbing material 12 being in the form of a solid, an optically absorbing gas, such as an atmosphere of trifluoronitrosomethane ($CF_3NO$) gas (for red optical radiation) or a vapor such as saturated nitrogen dioxide ($NO_2$) vapor (for blue radiation), can be used in conjunction with suitable diaphragms.

What is claimed is:

1. Apparatus which comprises
   a. a hollow chamber of the order of 0.001 $cm^3$ in volume,
   b. a first aperture in said chamber for the entry of light signals;
   c. light absorbing means for absorbing the light located in said chamber; and
   d. a second aperture in said chamber for the exit of acoustic signals into a hollow tube in accordance with the light signals, said acoustic signals having been generated in the chamber and said hollow tube adapted for acoustically transmitting said acoustic signals from a relatively narrow input end to a relatively wide output end.

2. Apparatus according to claim 1 in which said volume is in the range of about $5 \times 10^{-4}$ to about $2.5 \times 10^{-3}$ $cm^3$.

3. Apparatus according to claim 1 in which the chamber has an aperture for the insertion of an optical fiber.

4. Apparatus according to claim 1 which further comprises:
   the hollow tube of tapered inside cross section whose narrow end has an inside cross section of the order of 0.01 $cm^2$ and whose wide end has an inside cross section of the order of 1.0 $cm^2$, the length of said tube being of the order of 100 cm, the narrow end being acoustically coupled to the second aperture of the chamber, and said tapering being such that the inside cross section area varies monotonically from the narrow to the broad end.

5. Apparatus according to claim 4 in which the tube has an inside circular cross section of radius equal to about 0.04 cm at the narrow end and of radius equal to about 0.09 cm at the wide end.

6. Apparatus according to claim 4 in which the length of the tube is about 85 cm.

7. Apparatus according to claim 4 in which the chamber is acoustically coupled to the tube by a loaded diaphragm.

8. Apparatus according to claim 4 in which the wide end of the tube is coupled to an ambient atmosphere by a diaphragm and a perforated screen mutually defining a volume therebetween.

9. Apparatus according to claim 4 in which the chamber has an aperture for the insertion of an optical fiber.

10. Apparatus according to claim 4 in which the narrow end of the tube is acoustically coupled to the chamber by a hollow channel of length of the order of 2 cm and a substantially uniform cross section of the order of 0.001 $cm^2$.

11. Apparatus for converting an optical signal to an acoustic signal which comprises:
   a. a hollow chamber of the order of $10^{-3}$ $cm^3$ in volume having a first aperture for the insertion of an optical waveguide and a second aperture for acoustic coupling;
   b. a tapered hollow acoustic tube of the order of 100 cm in length having a first end of narrow inside cross-section area of the order of $10^{-2}$ $cm^2$ coupled acoustically to the second aperture of the chamber and a second end of wide inside cross-section area of the order of 1 $cm^2$ for acoustic coupling to a human ear, the inside cross section of said tube varying monotonically from the narrow to the wide end.

12. Apparatus according to claim 11 in which the waveguide is an optical fiber which is inserted in the first aperture.

13. Apparatus according to claim 11 in which the second end is acoustically coupled by means of an acoustic diaphragm.

* * * * *